United States Patent [19]
Robinson et al.

[11] Patent Number: 6,037,288
[45] Date of Patent: Mar. 14, 2000

[54] REINFORCEMENT OF CERAMIC BODIES WITH WOLLASTONITE

[76] Inventors: Sara M. Robinson, 3162 Lonesome Mountain Rd., Charlottesville, Va. 22911-6010; Donald B. Craig, 12 Summit Dr., Peru, N.Y. 12972

[21] Appl. No.: 08/848,305

[22] Filed: Apr. 30, 1997

[51] Int. Cl.$^7$ .............................. C04B 33/24; C04B 35/80
[52] U.S. Cl. ........................ 501/95.1; 501/95.2; 501/143; 501/144
[58] Field of Search ................................ 501/95.1, 95.2, 501/95.3, 5, 144, 143

[56] References Cited

U.S. PATENT DOCUMENTS

| | | | |
|---|---|---|---|
| 3,941,604 | 3/1976 | Boyce . | |
| 3,955,989 | 5/1976 | Nakamura | 501/5 |
| 3,964,917 | 6/1976 | Nakamura | 501/5 |
| 4,100,115 | 7/1978 | Baer | 521/83 |
| 4,118,236 | 10/1978 | Erskine | 501/144 |
| 4,377,415 | 3/1983 | Johnson et al. | 106/90 |
| 4,664,982 | 5/1987 | Genovese et al. . | |
| 4,801,564 | 1/1989 | Baba | 501/95.3 |
| 5,082,808 | 1/1992 | Nonami et al. | 501/95.3 |
| 5,275,978 | 1/1994 | Shibuya et al. | 501/5 |
| 5,284,904 | 2/1994 | George . | |
| 5,393,472 | 2/1995 | Shaw | 501/123 |
| 5,538,926 | 7/1996 | Tsuchida et al. | 501/95.3 |

FOREIGN PATENT DOCUMENTS

| | | |
|---|---|---|
| 403167248A | 7/1991 | Japan . |
| 408319399A | 12/1996 | Japan . |
| WO 93/23345 | 11/1993 | WIPO . |
| WO 96/33142 | 10/1996 | WIPO . |

OTHER PUBLICATIONS

Standard Terminology of Ceramic Whitewares and Related Products—American Society for Testing and Materials; ASTM Designation C242–96 No Date.
The US sanitaryware industry Fixtures in the plumbing business—Author John Burger. Industrial Minerals, Oct. 1990.
Wollastonite, Authors Ronald R. Bauer, Joseph R. Copeland and Ken Santini. No Date.
Ceram Research—Controlling Casting Slips in the Tableware Industry—authors W. P. Howells and B. Basnett. No Date.
Processing of Ultrafine Materials, presented by Ben Schneider, Alpine Product Specialist—Hosokawa Micron Powder Systems, Summit, New Jersey. Dec., 1995.
Mikro ACM Grinding Systems—Hosokawa MikroPul No Date.
Optimization of Body Formulations for Fast Firing of Sanitaryware. Authors S. Ozgen, E. Gorfulu, M. Koc, Technical University of Istanbul, Turkey No Date.
HF Emissions in Manufacturing Traditional Ceramics. Author Denis A. Brosnan, Center for Engineering Ceramic Manufacturing, Clemson Univ., Clemson, S.C. vol. 76, No. 1, Jan. 1997.
Investigating Fibre Reinforced Bodies, NPL Report QU113, Intercomparison of Colour Measurements by J. F. Verrill, P.I. No Date.
Ceramics (a Short Course). NYS College of Ceramics. Friday, February 25, 1994.
Wollastonite Mining in Essex County—The Burnham Family Influence, 1995 (No Month).
Clays and compositions for the rapid processing of sanitaryware. Author S. Santoro. No Date.
Wollastonite, An Industrial Mineral, Bulletin No. 4, Ceramic Experiment Station, New York State College of Ceramics, compiled by C. R. Amberg and J. F. McMahon No Date.
Overview of Traditional Ceramics, Authors Richard A. Haber and Peter A. Smith, CEramic Casting Technology Program, Rutgers, The State University of New Jersey. No Date.
Wollastonite. Nyco's Versatile Mineral, Nyco Minerals, Inc. No Date.
CA:108:26151, Tadzhiev et al, "Use of Wollastonite in an Electrical Porcelain Composition" 1987.
CA:107:11829, Ena Gutierrez et al, "Manufacture of Ceramic Product" Feb. 1985.
CA:106:161296, Dan et al "Development of Wollastonite–Based Porcelains for Low Firing Temperature" 1986.
Sainamthip et al, "Fast–Fired Wall Tiled Bodies Containing Wollastonite", Am. Cerm. Soc. Bull., 66,(12): 1726–1731, 1987.

*Primary Examiner*—Karl Group
*Attorney, Agent, or Firm*—Harter, Secrest & Emery LLP; Stephen B. Salai

[57] ABSTRACT

The use of wollastonite fibers having relatively long average fiber lengths as reinforcement agents for unfired sanitaryware bodies. The addition of refined wollastonite to sanitaryware bodies exhibited improved resistance to propagation of cracks, reduced drying and firing shrinkage, fluxing activity, an HF release inhibition upon firing. Reduced shrinkage and increased permeability improves the resistance to cracking during rapid drying and allows faster time schedules to be employed.

22 Claims, 4 Drawing Sheets

REINFORCEMENT OF CERAMIC BODIES WITH WOLLASTONITE

FIELD OF THE INVENTION

This invention relates to the use of naturally occurring acicular fibers, such as wollastonite, to reinforce sanitaryware bodies and inhibit the propagation of cracks throughout such bodies.

BACKGROUND OF THE INVENTION

Sanitaryware is glazed, vitrified whiteware ceramic having a sanitary service function as bathtubs, sink basins, toilets, etc. Many attempts have been made by the ceramic industry to improve the quality and strength of ceramic products, particularly lowering the cracking and breakage rate of sanitaryware. Such attempts have included incorporating fibrous materials into the sanitaryware. Standard sanitaryware bodies show a typical brittle fracture pattern in which minor energy is required to propagate a crack once the crack has been initiated. Previous studies have shown that adding glass fibers to sanitaryware ceramic mixtures modify fracture behavior, increase the modulus of rupture and work of fracture values, and inhibit the propagation of cracks. However, the use of special glass fibers may not be suitable for use in sanitaryware manufacturing due to the cost, health risks, and the physical properties of the glass fibers. In addition, the glass may not exhibit plastic-like behavior during firing.

Sanitaryware bodies containing fibers exhibit an inhibited fracture pattern. In these fiber containing bodies, a significant amount of energy is required to propagate cracks due to the fibers binding the body together. Chopped fiberglass, has been investigated as a possible additive material to enhance reinforcement. However, chopped fiberglass and other fiber-like materials including cellulose fiber, and processed mineral fibers (rock wool), silicon fiber, carbon fiber, and potassium titanate have cost or processing limitations, inhibiting their commercial usefulness. For example, chopped fiberglass and rock wool are prohibitively expensive, while cellulose fiber, and processed mineral fibers must first be processed. Others, such as potassium titanate, pose potential health risks.

Wollastonite is a natural calcium silicate that has a theoretical composition of $CaSiO_3$ (which may also be written $CaO.SiO_2$). The chemical composition of wollastonite is understood to be about 48.3% calcia (CaO) and about 51.7% silica ($SiO_2$). A significant use of wollastonite is in ceramics such as wall tile, where it promotes low shrinkage, good strength, low warparge, and fast firing. It is also used in porcelain, as a filler in paint, plastics and papers, as an electrode coating, as a protective slag for continuous casting carbon steel and casting silicon steel sheet, and in asbestos replacement. It is believed that one of the major reasons surrounding the successful use of wollastonite in ceramic products is that the silica is not present as a separate phase in the ceramic product. Silica has a significantly different thermal coefficient of expansion than the other phases present in the fired ceramic product. It also undergoes a phase transformation during the cooling of the ceramic product. Both of these factors cause cracking of the ceramic product unless a slow cooling rate is used. By eliminating the free silica phase, higher firing and cooling rates can be employed.

The use of wollastonite for reinforcement of sanitaryware has not been fully investigated. Sanitaryware is typically defined as glazed, vitrified whiteware fixtures having a sanitary service function, such as for lavatory basins, bathtubs, and toilets, etc. Sanitaryware differs from wall tile in many respects, such as size and shape. Generally, wall tile is limited to a small size, such as a 3"×3" tile. Further, tile is generally flat. However, sanitaryware is generally large in size( i.e. toilet, tub), and multiplanar. Therefore, the stresses and expansion dynamics of sanitaryware versus tile are considerably different. The firing conditions also vary with the use of plaster molds for sanitaryware and are significantly different than for other types of ceramics. Further, the use of wollastonite in tile is generally for its chemical properties of bound silica.

The present invention is directed to the discovery of the use of wollastonite, in the form of needle-like fibers or shards, as an additive to improve ceramic sanitaryware performance by inhibiting crack or microcrack propagation. Since wollastonite is relatively inexpensive, naturally occurring, non-carcinogenic and is easy to handle and transport, it would be highly beneficial to the ceramic industry, and specifically to the sanitaryware industry, if wollastonite could be incorporated into ceramic and sanitaryware products.

SUMMARY OF THE INVENTION

The present invention is directed to the use in sanitaryware of quantities and grades of wollastonite having specific length, diameter, aspect ratio (a function of length over diameter), and tap bulk density ranges.

The present invention is also directed to the discovery that the addition of predetermined grades and quantities of wollastonite, a naturally occurring calcium silicate preferably in the form of acicular fibers, reinforces sanitaryware bodies against crack propagation. In one embodiment, the present invention is directed to a ceramic, comprising an approximate range of about 1 to about 10 percent dry weight of needle-like fibers having a length of from about 50 to about 2000 micrometers. The needle-like fibers, preferably wollastonite fibers, have an average length from about 50 to 2000 micrometers, more preferably from about 50 to about 1200 micrometers, and most preferably from about 300 to about 900 micrometers.

A further embodiment of the present invention is directed to a sanitaryware ceramic comprising a sufficient quantity of wollastonite fibers having an aspect ratio in the approximate range of from about 2:1 to about 40:1.

In still further embodiments, the present invention is directed to a method of making a sanitaryware ceramic comprising an approximate range of from about 1 to about 10 percent by weight of wollastonite fibers having a length in an approximate range of from about 50 to about 2000 micrometers, draining the mixture to form a sanitary ceramic composition of a given viscosity, and firing the composition.

Another embodiment of the present invention is directed to a method of making ceramic sanitaryware comprising providing a ceramic mixture and providing wollastonite having a length from about 50 to about 2000 micrometers and an aspect ratio of from about 4:1 to about 20:1. Wollastonite is added to the ceramic mixture to a concentration of from about 1 to about 10 percent by weight followed by firing the mixture such that upon firing microcracks are formed in the sanitaryware. The microcracks are bridged with wollastonite fibers to inhibit the extent to which microcrack propagation normally occurs in sanitaryware.

In still another embodiment, the present invention is directed to a method of improving environmental safety during sanitaryware manufacture by reducing the amount of hydrogen fluoride gas that is liberated during ceramic firing. The method comprises providing a ceramic mixture and providing an amount of wollastonite having a length from about 50 to about 2000 micrometers and an aspect ratio of from about 4:1 to about 20:1. Wollastonite is added to the ceramic mixture to a concentration of from about 1 to about 10 percent by weight. The sanitaryware firing temperature is reduced sufficiently and the amount of hydrogen fluoride gas liberated from the ceramic mixture is reduced by up to about 10% of the amount released by the non-wollastonite containing control.

DETAILED DESCRIPTION OF THE PREFERRED EMBODIMENT OF THE INVENTION

Figure 1A:
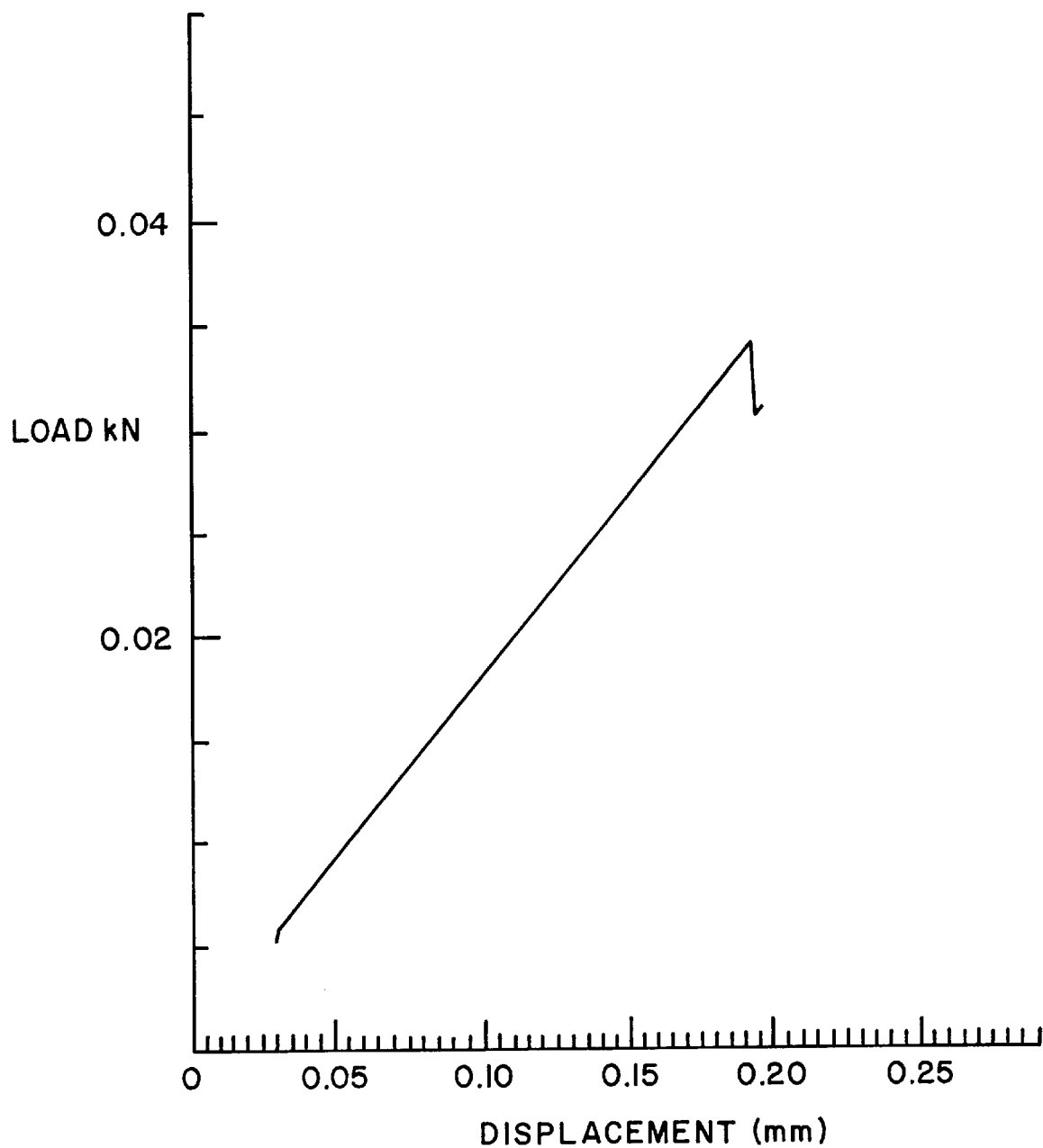
FIGS. 1a and 1b illustrate a load v. displacement plots.

Wollastonite has the theoretical composition of 48.3% CaO and 51.7% $SiO_2$. The composition of wollastonite could range from 40% to 60% CaO, 40% to 60% $SiO_2$, more preferably 44% to 49% CaO, 48% to 53% $SiO_2$, and most preferably about 47% CaO and about 51% $SiO_2$. Iron, manganese, magnesium, or strontium may also be present and substitute for some of the calcium. Commonly associated minerals include garnet, diopside, calcite, quartz, epidote, apatite, and sphene. Wollastonite is largely chemically inert. Because of its unique cleavage properties, wollastonite breaks down during crushing and grinding into lath-like or needle-shaped particles or shards of varying acicularity. This particle morphology imparts high strength and it is therefore desirable to include as a component in structural material. The acicularity of particles is defined by their length:width or length:diameter, ratio, (i.e., aspect ratio).

The wollastonite for use in the present invention may be selected from among known wollastonite grades. The grades contain needle-like fibers or shards having predetermined lengths, diameters, and aspect ratios, and preferably is of a 99% purity. Various sources of wollastonite exist. Wollastonite is mined from deposits in United States, Mexico, China, Finland, India, Canada and other various countries throughout the world. One large source of wollastonite is mined and supplied by NYCO Minerals, Inc. of Willsboro, N.Y. Synthetic wollastonite, comprising of less than 100% pure wollastonite is also available. Further, two polymorphs of calcium silicate exist: wollastonite in a low temperature form, and pseudowollastonite, a high temperature form. Conversion of wollastonite to pseudowollastonite occurs at about 1120° C. and results in an increase in the coefficient of expansion and a color change. The present invention is intended to include all various types of wollastonite in the form of needle-like fibers or shards having certain predetermined lengths, diameters, and aspect ratios.

The ceramic mixtures used for sanitaryware to which various amounts and grades of wollastonite were added are generally standard ceramic compositions comprising clay, quartz, and feldspathic minerals. In the present invention, and as shown in the following examples, the mixtures comprise (by dry weight percents) from about 22 to about 27 percent ball clay, from about 26 to about 35 percent china clay, from about 22 to about 32 percent quartz, from about 18 to about 27 percent feldspathic material, such as feldspar, nepheline syenite, etc. alone or in combination, and a sufficient amount of water to form a composition having a desired viscosity. Various other fillers, binders and other minerals, such as talc, iron and alumina, alone or in combination may be present in small amounts. Selection of an appropriate ceramic mixture useful for the manufacture of sanitaryware is well within the skill of those in the sanitaryware field.

The present invention is directed to the addition of various amounts and grades of wollastonite, beneficiated from mined material and then milled according to known and accepted practices in the field of wollastonite processing, to mixtures of unfired ceramic materials useful as sanitaryware. The mixtures were stirred to a sufficient slurry such that the ceramic mixture comprised preferably from about 1 to about 10 percent dry weight of needle-like wollastonite fibers, more preferably from about 3 to about 7 percent dry weight of needle-like wollastonite fibers, and most preferably about 5 percent dry weight of needle-like wollastonite fibers having lengths from about 50 to about 2000 micrometers, more preferably from about 50 to about 1200 micrometers, and most preferably from about 300 to about 900 micrometers. The needle-like wollastonite fibers preferably comprise a diameter from about 10 to about 500 micrometers, more preferably a diameter from about 10 to about 400 micrometers, and most preferably from about 20 to about 100 micrometers. Further, the needle-like fibers comprise an aspect ratio from about 2:1 to about 40:1, and more preferably from about 3:1 to about 20:1. The needle-like fibers preferably have a tap bulk density, as determined by ASTM C-87, from about 0.1 g/cc to about 1.4 g/cc, more preferably from about 0.6 g/cc to about 1.2 g/cc, and most preferably from about 0.89 g/cc to about 1.06 g/cc.

The unfired ceramic mixtures, referred to as "slips", are poured into plaster molds of predetermined sizes and shapes. As is well known in the field of ceramics manufacturing, the plaster molds absorb a sufficient amount of water from the slip. A layer of the solid composition of the slip accumulates on the surface of the plaster mold. Once the desired thickness of the unfired ceramic or greenware is attained, the remaining amount of slip is drained from the plaster mold. The plaster mold is removed or "stripped", according to well known techniques in the field of ceramic manufacturing. The unfired ceramic is dried at an approximate temperature from about 25° C. to about 60° C. The unfired ceramic may then be fired in a kiln at a sufficient temperature from about 1100° C. to about 1400° C.

The present invention is directed to the reinforcement of unfired and fired ceramics comprising predetermined quantities and grades of wollastonite. It has now been discovered that predetermined amounts and grades of wollastonite inhibit the propagation of microcracks in both the unfired and fired ceramics, and more specifically, sanitaryware. The addition of wollastonite, most preferably 5 percent dry weight of needle-like fibers having lengths from about 300 to about 900 micrometers with aspect ratios from about 3:1 to about 20:1 reduces the propagation of cracks in the ceramic, thereby reducing the physical loss of ceramic pieces and the economic cost of producing a predetermined number of pieces. The addition of wollastonite within the above-mentioned parameters produces a stronger, more durable, robust unfired and fired ceramic. In addition the addition of wollastonite offers an improvement in reducing required firing temperatures and shows a measurable fluxing effect. In addition, the use of the above-stated preferred amounts of wollastonite as an additive for sanitaryware ceramics reduces the total volume of hydrogen fluoride gas emitted upon firing, of up to about a 10% reduction.

The following examples serve only to further illustrate aspects of the present invention and should not be construed as limiting the invention.

EXAMPLE 1
Preparation of Sanitaryware Samples

Ceramic samples were prepared using the highest addition level (about 7%) and the lowest addition level (about 1%) of wollastonite on a dry solids basis. The wollastonite used was 99% pure wollastonite, although less pure grades could conceivably used so long as weight percent concentrations are observed.

The unfired ceramic samples were prepared by adding varying amounts of dry wollastonite to a stirred slurry containing sodium silicate and diluted acetic acid to control rheology. A flat-bladed paddle was used to produce sufficient agitation to disperse the wollastonite fibers while not creating high shear conditions which may break the fibers. The samples were stirred for 30 minutes to insure full dispersion after the last of the wollastonite had been added. The mixture density was reset to its initial value by adding water. The fluid properties of the mixture were measured and recorded before casting tests were carried out.

EXAMPLE 2
Measurement of Casting Rates

The casting rates of the mixtures were determined from measurements of drain casts formed in standard molds at 60 minutes. These values were used to calculate the time required to form the normal 8 mm thickness of cast. The moisture content of the casts was also measured.

The cast permeability was obtained from the rate at which the mixture could be filtered using a Baroid press, according to CERAM standard test methods for ceramic whiteware for raw materials well-known to ceramics engineers, with an applied pressure of 60 psi (4.21 kg/square cm).

The completeness of slip drainage at the end of the casting period was assessed by using the weight of the slip which fails to drain from a beaker having a sufficient capacity after standing for a predetermined time. Preferably, the beaker is a 500 mL beaker having an approximately 9 mm aperture drilled through the center of its base. Preferably, the aperture is closed with a plug fitted from below. The beaker is filled with the mixture and the slip stands for approximately 1 hour. The plug is removed and the slip drains for a predetermined time, preferably about 5 minutes. The amount of remaining mixture is measured by reweighing the mixture and the beaker, with the plug refitted. As the base of the beaker is slightly curved, a correction is made for the volume of the mixture which is below the level of the hole.

EXAMPLE 3
Drying and Shrinkage Measurements

Drying and firing shrinkage values were measured on solid cast slabs. These slabs were inscribed with reference marks as they were removed from the molds. The separation between the marks after drying and firing on a standard schedule was measured therefrom.

EXAMPLE 4
Strength Tests

Cylindrical rods, 12.5 mm in diameter were slip cast for tests of unfired strength and work of fracture measurements. The samples were fully dried at 110° C., then tested using an Instron testing machine, available from Instron Instrumentation Company of Canton, Mass., USA.

EXAMPLE 5
Reinforcement Values

Table 1 shows the reinforcement results of ceramic sanitaryware comprising wollastonite having aspect ratios of from about 5:1 to about 40:1. Further experiments were conducted on different grades of wollastonite.

TABLE 1

Particle Sizes of Wollastonite Samples in Preliminary Studies

| Wollastonite Sample | Length ($\mu$m) | Diameter ($\mu$m) | Aspect Ratio |
| --- | --- | --- | --- |
| A | 100–1000 | 10–100 | 5:1–20:1 |
| B | 100–1000 | 10–100 | 5:1–30:1 |
| C | 100–300 | 10–50 | 5:1–40:1 |
| D | 50–300 | 5–20 | 10:1–40:1 |
| E | 50–400 | 10–50 | 5:1–25:1 |

EXAMPLE 6

As Table 2 demonstrates, multiple tests were conducted on unfired ceramic bodies containing varying amounts of Sample A wollastonite, in the preferred range from about 1% to about 7% by dry weight. The additions of Sample A wollastonite produced a modification in the fracture behavior of the body, resisting crack propagation. Firing and drying shrinkage rates were reduced and permeability was increased by the addition of Sample A wollastonite as compared to samples without any additions of Sample A wollastonite. As shown in Table 2, more rapid drying could be safely achieved and the linear firing contraction of the sanitaryware body was reduced by the additions of wollastonite, further indicating a reduction in the body's tendency to crack.

TABLE 2

Properties of Unfired Sanitaryware Bodies With Various Additions of Wollastonite Sample A

| Percentage Addition of A | 0% | 1% | 3% | 5% | 7% |
| --- | --- | --- | --- | --- | --- |
| Slip Density (g/l) | 1819 | 1820 | 1819 | 1820 | 1818 |
| Gallenkamp Fluidity (°) | 310 | 308 | 309 | 308 | 310 |
| Gallenkamp Thixotropy (°) | 48 | 49 | 44 | 48 | 30 |
| Thickness (mm) | 7.57 | 7.53 | 6.93 | 7.46 | 6.55 |
| Casting Rate (mm$^2$/min) | 0.955 | 0.945 | 0.800 | 0.928 | 0.715 |
| 8 mm Cast Time (mins) | 67 | 68 | 80 | 69 | 90 |
| Filtration Rate (g/min$^{-\frac{1}{2}}$) | 1.748 | 1.764 | 1.845 | 1.907 | 2.031 |
| Undrained Slip (g) | 55.0 | 66.9 | 48.5 | 58.2 | 39.1 |
| Drain Cast Moisture Content (% Dry Basis) | 20.0 | 22.4 | 21.4 | 22.1 | 20.8 |
| Drying Shrinkage (%) | 2.63 | 2.14 | 1.81 | 1.88 | 1.19 |
| Firing Shrinkage (%) | 8.13 | 8.01 | 6.78 | 5.67 | 4.46 |

TABLE 2-continued

Properties of Unfired Sanitaryware Bodies
With Various Additions of Wollastonite Sample A

| Percentage Addition of A | 0% | 1% | 3% | 5% | 7% |
|---|---|---|---|---|---|
| Total Shrinkage (%) | 10.55 | 10.15 | 8.34 | 7.45 | 5.61 |
| Unfired Modulus of Rupture (Mpa) | 4.223 | 3.59 | 3.90 | 4.26 | 4.164 |
| Work of Fracture (peak) | 19.94 | 15.19 | 15.89 | 16.13 | 16.44 |
| Work of Fracture (end) | 19.99 | 15.65 | 19.57 | 22.12 | 25.35 |
| Work of Fracture (A/A + B) | 99.73 | 97.03 | 81.20 | 72.12 | 64.83 |

All tests were conducted according to CERAM Research standards (CERAM Research, Stoke-on-Trent, England) and are well-known to those skilled in the ceramics field.

EXAMPLE 7

As shown in Table 3, five beneficiated grades of wollastonite that had relatively long average fiber lengths were tested as suitable additions to a sanitaryware body. Aspect ratios ranged from about 2:1 to about 20:1 with an approximate length of from about 50 to from about 1000 micrometers and an average diameter of from about 10 to from about 150 micrometers. The aspect ratios, lengths and diameters were determined of an electron scanning microscope.

TABLE 3

Electron Microscope Examination Of Wollastonite Grades

| Grade | Fiber Length (micrometers) | Fiber Diameter (micrometers) | Aspect ratio |
|---|---|---|---|
| 1 | 100–1000 | 10–150 | 3:1–20:1 |
| 2 | 50–1000 | 10–100 | 5:1–15:1 |
| 3 | 50–1000 | 10–100 | 3:1–20:1 |
| 4 | 50–1000 | 10–150 | 5:1–20:1 |
| 5 | 100–1000 | 20–100 | 2:1–10:1 |

The examination of the fibers were conducted using an electron scanning microscope at a 50× magnification power. Where low aspect ratios are indicated, many thick needles were present.

All of the Grades 1–5 showed maximum fiber lengths in the approximate range of 1000 microns. Grade 1 and Grade 2 showed a broad range of fiber sizes, with a mixture of fine and coarse fibers present. Grades 3–5 showed a higher proportion of long, thick fibers. Grade 3 contained a greater proportion of finer fibers. Further, there was no clear visual distinction between Grades 4 and 5.

EXAMPLE 8

The maximum proportion of each grade of wollastonite which could be added to the slip without seriously affecting its fluid properties was assessed by making progressive additions to small slip samples. After each addition of wollastonite (dry weight percentage), the slip's density was reset to its initial value and its fluidity and 1-minute thixotropy (the property exhibited by certain gels of becoming liquid when stirred or shaken) were measured using a Gallenkamp viscometer. The measured values are listed in Table 4.

TABLE 4

Fluidity and Thixotropy Values of Slip Samples After Additions of Wollastonite

| Addition (%) | Grade 1 | Grade 2 | Grade 3 | Grade 4 | Grade 5 |
|---|---|---|---|---|---|
| 0 | 299/57 | 299/57 | 299/57 | 300/60 | 300/60 |
| 2 | 306/49 | 305/50 | 307/48 | 308/46 | 309/56 |
| 4 | 309/48 | 303/52 | 311/40 | 313/37 | 312/43 |
| 6 | 301/51 | 305/42 | 311/41 | 318/31 | 315/38 |
| 8 | 304/47 | 318/35 | 319/29 | — | 322/29 |
| 10 | 317/32 | — | — | — | — |

All values were measured using a Gallenkamp viscometer with thixotropy measured over one minute.

All of the Grades 1–5 produced a deflocculating effect which caused increases in fluidity and reductions in thixotropy as the proportions of wollastonite were increased. The same pattern of behavior was found for additions of Sample A in the preliminary trials. Preferably, it was necessary to maintain the fluid properties of the slip within fairly narrow bands. Therefore, the addition level for each wollastonite sample produced a thixotropy value of preferably 40 degrees, for easy handling and fluid properties. On the basis of dry solids content, the preferable quantities of wollastonite added to the slip for casting trials were about 6% for Grades 1 and, about 5% for Grades 3 and 5, and about 4% for Grade 4.

Slip samples were prepared using the aforementioned addition levels. A standard control sample of a standard slip, with zero percent wollastonite added, was deflocculated so that its fluid properties exhibited similar properties as the modified Grades 1–5.

EXAMPLE 9

Casting and Cast Properties

The properties of casting bodies were determined for each of the slip samples. The properties measured were casting rate, cast permeability, slip drainage, cast moisture content, dry modulus of rupture, work of fracture and contraction on drying and firing using standard industry testing procedures within the skill of those in the ceramics field. The basic body used for all of the trials was a representative British vitreous china sanitaryware type comprised of the standard unfired ceramic mixture of preferably (by dry weight percents): about 22 to about 27 percent ball clay, about 26 to about 35 percent china clay, about 22 to about 32 percent quartz, about 18 to about 27 percent feldspathic material, such as feldspar and/or nepheline syenite, and a sufficient amount of water to form a composition having a desired viscosity. Selection of an appropriate ceramic mixture is well within the skill of those in theceramics field. The methods reported and described for the preliminary trials were repeated for the following tests.

The results of the property tests are listed in Table 5. All of the slips to which wollastonite (Grades 1–5) were added showed very similar casting properties; characterized by a slight reduction in casting rate and cast moisture content, an increase in permeability and a marked reduction in drying and firing shrinkage compared to the standard body. The unfired Modulus of rupture of the bodies were not significantly affected by the added wollastonite.

Further analysis of the particle sizes of Grades 1–5, according to Testing Procedure ASTM C-87, known to those skilled in the ceramics field, revealed an approximate range of from about 0.89 g/cc to about 1.06 g/cc tap bulk density.

All of the wollastonite Grades 1–5 reduced the shrinkage of the body during drying and firing and modified the fracture behavior of the body. The greatest changes were found when high proportions of wollastonite could be added and where the maximum fiber length of the wollastonite was used. Most preferably, a 5% dry weight of wollastonite was added.

The modulus of rupture of the standard and modified body grades 1–5 were similar. The sanitaryware bodies containing wollastonite (Grades 1–5) were more resistant to impact damage than the standard body. This was particularly apparent when the casting rate test samples had to be broken before measuring. Qualitatively, significantly more force was required to break the modified samples. The bodies having the added wollastonite held together after fracture and had to be physically pulled apart. The standard body samples shattered if struck with the same approximate amount of force.

EXAMPLE 10
Qualitative Fracture Behavior

Figure 1B:
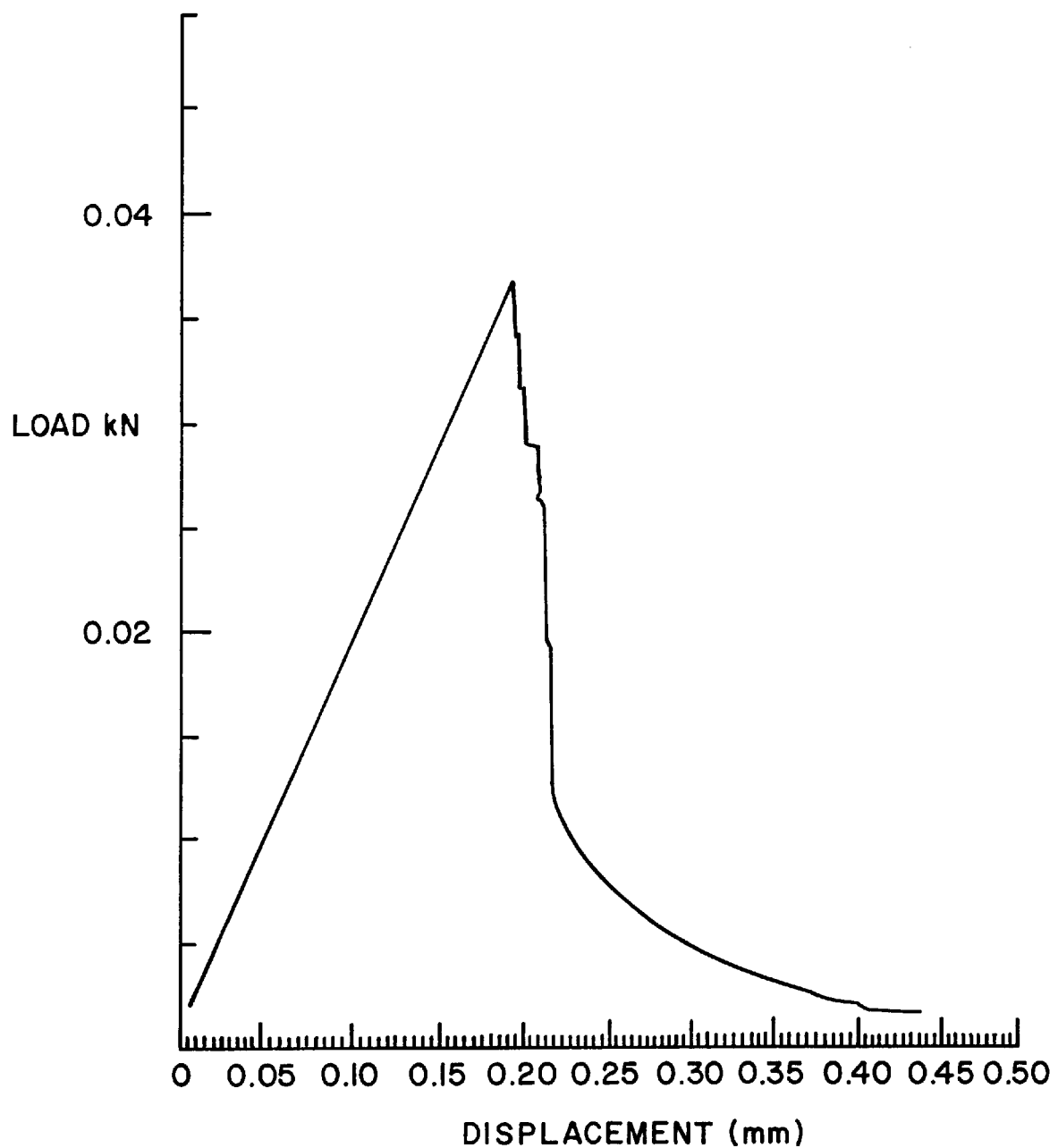

The fracture behavior was affected quite strongly by the presence of the wollastonite fibers. The standard body exhibited a brittle fracture pattern in which very little additional energy is required to propagate a crack to run through body once it has been formed. The standard body showed a sudden catastrophic failure. In the sanitaryware bodies containing wollastonite, initial crack formation occurred with a lower pressure loading on the bodies than in the standard body. A considerable amount of energy had to be expended to propagate the cracks. This behavior is illustrated by the Work of Fracture test results, illustrated by plots of loading against time, as shown in FIGS. 1a and 1b. Unlike the standard body, which snapped apart during the tests, the sanitaryware bodies (Grades 1–5) containing the wollastonite held together and had to be pulled apart to separate the halves. Therefore, adding wollastonite having maximum fiber lengths greatly impacted the fracture behavior, shrinkage and cast permeability. These properties, together with body strength, have the greatest influence on the tendency of casts to develop cracks during rapid drying. The grades of wollastonite, having longer fibers, greatly improved crack resistance.

The magnitude of the changes in fracture behavior was linked to the proportion of wollastonite which is added to the body. As shown in Tables 2 and 5, greater additions of wollastonite, exhibited a stronger effect. All testing was done in accordance with the tests recited in Recommended Test Methods for Ceramic Whiteware Raw Materials, by CERAM Research of Stoke-on-Trent, England. The preferred quantities of wollastonite added to the body was typically from about 1% to about 7%, more preferably from about 3% to 5% and most preferably about 5%, as in Grade 3.

An approximate increase of about 2% in the Modulus of Rupture values was achieved through the additions of wollastonite. However, the loading required to initiate a crack is believed to be primarily dependent upon the amount of contact between the clay particles within the body. Thus, making an addition of non-clay material reduces the inter-particle contact and allows cracks to be initiated at lower loading. The additional energy input required to extend the crack through the Grades 1–5 was increased from an approximate value of about 0.11 J/m$^2$ to about 5 J/m$^2$, representing an approximate 4,445% increase in the energy needed to extend a crack in the body, by subsequent 5% wollastonite additions.

TABLE 5

Properties of Body Grades

| Wollastonite | Standard | Grade 1 | Grade 2 | Grade 3 | Grade 4 | Grade 5 |
| --- | --- | --- | --- | --- | --- | --- |
| Addition (%) | — | 6 | 6 | 5 | 3 | 5 |
| Gallenkamp Fluidity (° C.) | 316 | 317 | 317 | 321 | 318 | 321 |
| Gallenkamp Thixotropy (° C.) | 38 | 42 | 37 | 31 | 36 | 35 |
| 60 min cast thickness (mm) | 7.02 | 6.72 | 6.55 | 6.46 | 6.42 | 6.40 |
| Casting rate (mm$^2$/min) | 0.821 | 0.753 | 0.715 | 0.696 | 0.687 | 0.683 |
| 8 mm cast time (mins) | 78 | 85 | 89.5 | 92 | 93 | 94 |
| Filtration rate (g/min) | 1.67 | 2.00 | 1.88 | 1.98 | 1.87 | 1.80 |
| Undrained slip weight (g) | 43.2 | 53.1 | 50.5 | 45.4 | 46.1 | 41.3 |
| Drain cast moisture (% dry basis) | 22.5 | 21.4 | 21.9 | 22.3 | 22.1 | 22.1 |
| Drying shrinkage (%) | 2.70 | 1.66 | 1.81 | 1.83 | 1.97 | 1.76 |
| Firing shrinkage (%) | 8.12 | 5.60 | 5.47 | 6.08 | 6.56 | 6.08 |
| Total shrinkage (%) | 10.52 | 7.19 | 7.16 | 7.64 | 8.38 | 7.68 |
| Unfired Modulus of Rupture (MPa) | 4.20 | 4.03 | 4.06 | 4.29 | 4.08 | 4.11 |
| Work of Fracture (peak) | 17.79 | 17.08 | 16.47 | 17.09 | 16.20 | 16.54 |
| Work of Fracture (end) | 17.90 | 22.93 | 20.98 | 21.78 | 18.53 | 21.42 |
| Work of Fracture (A/A + B) | 99.46 | 74.46 | 78.49 | 78.42 | 87.35 | 77.21 |
| Minimum firing temp to vitrify (° C.) | 1185 | 1170 | 1170 | 1170 | 1185 | 1185 |

EXAMPLE 11
Firing Properties

Grades 1–5 were fired to temperatures ranging from about 1140° C. to about 1200° C., with a 90 minute dwell at peak temperature. These were then subjected to the water absorption test described in British Standard 3402, well known to those skilled in the sanitaryware field. The grades were required to show an absorption value of less than 0.5% to be acceptable. The results from these tests are listed in Table 6.

The standard body had to be fired to at least about 1185° C. to achieve full vitrification. Such behavior is typical of the heat treatment required for most sanitaryware bodies. Grades 1, 2, and 3 were all vitrified by firing from about 1170° C. to about 1185° C., preferably 1170° C., showing a significant fluxing effect of the wollastonite additions.

Grades 4 and 5, containing more highly classified wollastonites, were not vitrified until fired to about 1185° C., thus minimal fluxing effect had been obtained. The finer fibers are believed to be most responsible for the increased fluxing effect, as their presence is thought to increase the wollastonite's surface area and reactivity.

TABLE 6

Percentage Water Absorption of Samples Given Different Firing Treatments, Measured Using British Standard 3402 Method

| Firing Temperature | Standard | Grade 1 | Grade 2 | Grade 3 | Grade 4 | Grade 5 |
|---|---|---|---|---|---|---|
| 1140° C. | 5.43 | 6.40 | 6.3 | 5.40 | 5.40 | 5.70 |
| 1155° C. | 3.10 | 3.45 | 2.10 | 2.65 | 2.80 | 3.15 |
| 1170° C. | 0.96 | 0.23 | 0.25 | 0.19 | 0.68 | 1.03 |
| 1185° C. | 0.14 | 0.14 | 0.10 | 0.12 | 0.10 | 0.09 |
| 1200° C. | 0.12 | 0.10 | — | 0.16 | 0.13 | 0.10 |

EXAMPLE 12

Wollastonite and the HF Emission of a Conventional Sanitaryware Body

Grade 3, having the greatest proportion of finer fibers, was selected as the grade to test during the HF emission trials.

Grade 3 was introduced into a conventional sanitaryware body mix and the HF Emission profile, as a function of both time and temperature, was determined under both "dry" and "wet" kiln atmospheric conditions. See FIGS. 2 and 3 respectively. The "dry" condition represents an electric kiln atmosphere while the "wet" (about 15.5% moisture) atmosphere was representative of standard gas open flame firing conditions found in the sanitaryware industry. The air flow through the kiln was maintained at about 1.21 $min^{-1}$.

The HF emission tests were conducted using an HF Analyzer, commercially available from CERAM Research of Stoke-on-Trent, England. The total HF emitted for each sample was calculated and shown in Table 7. An approximate reduction of about 0.01 mg/g of total HF emission was obtained in dry kiln atmospheric conditions while a more substantial approximate reduction of about 0.05 mg/g of total HF emission was achieved in wet kiln atmospheric conditions.

Figure 2:
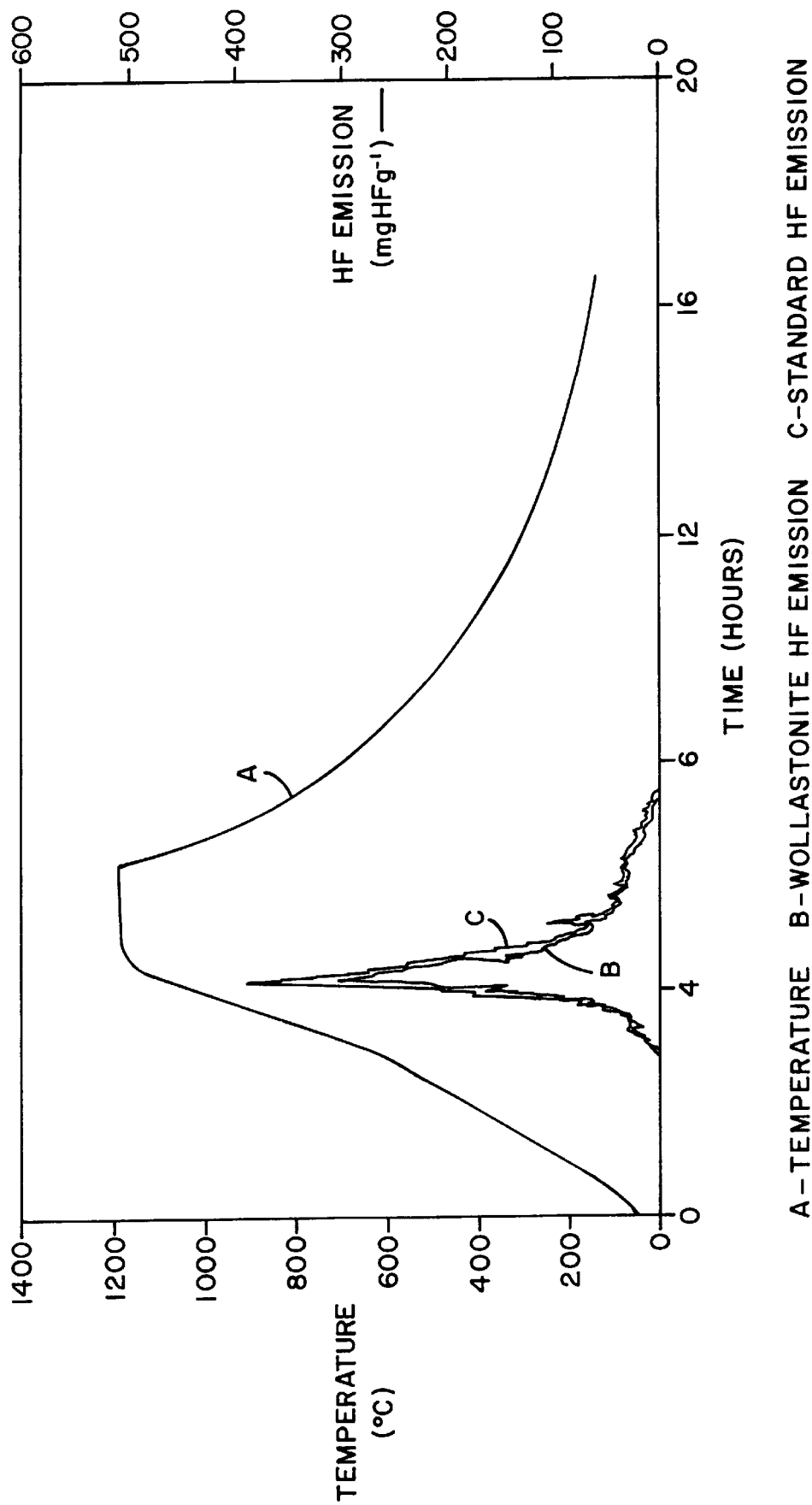
FIG. 2 illustrates dry atmosphere HF profiles.

FIG. 2 compares the standard control body with one that has been doped with wollastonite under dry atmospheric conditions. The addition of wollastonite reduced the peak HF emission from 389 $mgm^{-3}$ to 300 $mgm^{-3}$.

Figure 3:
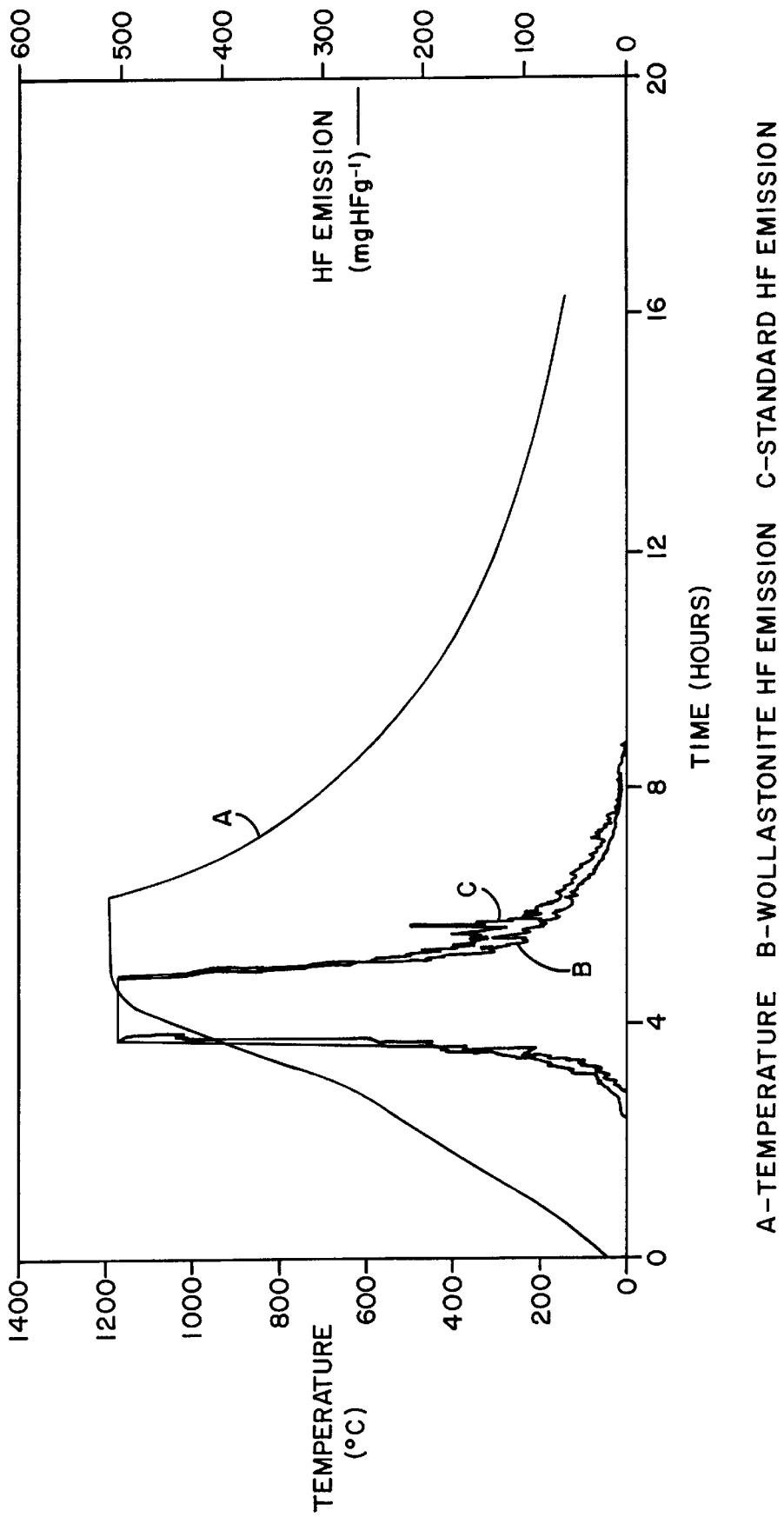
FIG. 3 illustrates wet atmosphere HF profiles.

FIG. 3 is a similar comparison under wet atmospheric conditions. The presence of moisture in the kiln atmosphere encourages HF evolution (see equation 1). The total HF emitted per gram of sample is reduced from about 0.48 mg $HFg^{-1}$ in the standard body to about 0.43 mg $HFg^{-1}$ in the wollastonite-containing body of Grade 3. This is equivalent to approximately a 10% reduction in the amount of HF gas emitted.

$$MF + H_2O \rightarrow MOH + HF \tag{I}$$

Where M=Clay mineral

TABLE 7

HF Emission

| Body | Kiln Atmosphere | Unfired Weight (g) | Temp. at which Emission Begins | Peak HF ($mgm^{-3}$) | Total HF (mg) | Total HF (mg/g) |
|---|---|---|---|---|---|---|
| Standard | Dry | 141.0 | 650° C. | 386 | 24.4 | 0.17 |
| Standard | Wet | 141.5 | 526° C. | >500 | >68.5 | 0.48 |
| 3 | Dry | 134.6 | 630° C. | 300 | 21.4 | 0.16 |
| 3 | Wet | 142.1 | 630° C. | >500 | >60.5 | 0.43 |

EXAMPLE 13

Impact Resistance

A Grade 3 wollastonite sample was investigated for its impact resistance properties in which a steel projectile, preferably a 0.75 inch diameter ball, was dropped from a predetermined height onto a test tile and/or full cast body which comprised 5% of Grade 3 wollastonite. The impact energy of the of the impact was varied by progressively increasing the height from which the steel projectile was dropped. Standard test tiles with 0% of wollastonite were used as control standards for comparisons.

Test tiles of standard Caradon® sanitaryware bodies, well known to those skilled in the art, having thicknesses of from about 0.496 inches to about 0.520 inches, required breaking impacts from about 0.048 to about 0.60 ft.lbf while Caradon® sanitaryware bodies comprising 5% of Grade 3 wollastonite, having approximate thicknesses from about 0.472 inches to about 0.506 inches, required impacts in the approximate range of from about 0.048 ft.lbf to about 0.064 ft.lbf to cause initial damage. Breaking impacts occurred at from about 0.048 ft.lbf to about 0.068 ft.lbf. The strength factors of the samples were calculated using the ASTM formula $$12 I/t^2 \tag{II}$$

where I is impact energy causing breaking failure and t is the sample thickness. The Caradon® bodies comprising 5% of Grade 3 wollastonite revealed an average initial damage strength factor of approximately 2.836 and an average final failure strength factor of approximately 2.963. Such results reveal an increase in the approximate range of about 10% in average strength value before initial damage was detected and an increase in the approximate range of about 20% in average strength value for final failure or breakage over standard Caradon® sanitaryware bodies comprising 0% wollastonite, which had an average strength value of about 2.562.

The tests results are shown in Tables 8 and 9.

TABLE 8

Tests of Impact Resistance of Solid Cast Slabs (Control Standard Caradon ® Sanitaryware Bodies)

| Control Sample | Breaking Energy (ft.lbf) | Sample Thickness (in.) | Strength Value |
|---|---|---|---|
| 1 | 0.056 | 0.506 | 2.625 |
| 2 | 0.052 | 0.496 | 2.536 |
| 3 | 0.060 | 0.512 | 2.747 |
| 4 | 0.048 | 0.516 | 2.163 |
| 5 | 0.056 | 0.502 | 2.667 |
| 6 | 0.060 | 0.520 | 2.663 |

TABLE 8-continued

Tests of Impact Resistance of Solid Cast Slabs
(Control Standard Caradon ® Sanitaryware Bodies)

| Control Sample | Breaking Energy (ft.lbf) | Sample Thickness (in.) | Strength Value |
|---|---|---|---|
| 7 | 0.060 | 0.512 | 2.747 |
| 8 | 0.056 | 0.516 | 2.524 |
| 9 | 0.048 | 0.496 | 2.341 |
| 10 | 0.056 | 0.508 | 2.604 |
| Average | 0.055 | 0.508 | 2.562 |

TABLE 9

Tests of Impact Resistance of Solid Cast Slabs
(Caradon ® Sanitaryware Bodies with 5% Grade 3 Wollastonite)

| Test Sample | Energy causing initial damage (ft.lbf) | Energy causing final (breakage) damage (ft.lbf) | Thickness (in.) | Strength value (initial damage) | Strength value breakage |
|---|---|---|---|---|---|
| 1 | 0.060 | 0.060 | 0.492 | 2.974 | 2.974 |
| 2 | 0.052 | 0.056 | 0.500 | 2.496 | 2.688 |
| 3 | 0.062 | 0.068 | 0.492 | 3.074 | 3.371 |
| 4 | 0.062 | 0.062 | 0.492 | 3.074 | 3.074 |
| 5 | 0.060 | 0.064 | 0.496 | 2.974 | 3.122 |
| 6 | 0.056 | 0.060 | 0.500 | 2.688 | 2.880 |
| 7 | 0.048 | 0.052 | 0.472 | 2.585 | 2.801 |
| 8 | 0.064 | 0.064 | 0.498 | 3.097 | 3.097 |
| 9 | 0.064 | 0.068 | 0.506 | 3.000 | 3.187 |
| 10 | 0.064 | 0.064 | 0.496 | 3.122 | 3.122 |
| 11 | 0.052 | 0.056 | 0.488 | 2.620 | 2.822 |
| 12 | 0.048 | 0.048 | 0.472 | 2.585 | 2.585 |
| 13 | 0.048 | 0.052 | 0.472 | 2.585 | 2.801 |
| Average | 0.057 | 0.060 | 0.490 | 2.836 | 2.963 |

EXAMPLE 14

Additional impact tests, using the same techniques as the Caradon® body tests, were conducted on Armitage® Shank sanitaryware bodies comprising (1.) 5% Grade 3 wollastonite and (2.) 0% wollastonite as a control standard. The test results revealed strength values for the 5% addition of Grade 3 wollastonite bodies increased from about 50 to about 55% for initial failure and increased from about 60 to about 65% for breakage or final failure.

TABLE 10

Impact Resistance Test on Armitage ® Shank Standard Body

| Standard Test Sample (0% wollastonite) | Breaking Energy (ft.lbf) | Test sample thickness (inches) | Strength factor value |
|---|---|---|---|
| Drain Cast Test Sample | | | |
| 1 | 0.020 | 0.339 | 2.088 |
| 2 | 0.016 | 0.331 | 1.752 |
| 3 | 0.012 | 0.346 | 1.203 |
| 4 | 0.020 | 0.370 | 1.753 |
| 5 | 0.020 | 0.382 | 1.645 |
| 6 | 0.016 | 0.382 | 1.316 |
| 7 | 0.016 | 0.362 | 1.465 |
| 8 | 0.024 | 0.343 | 2.448 |
| Average | 0.018 | 0.357 | 1.709 |

TABLE 10-continued

Impact Resistance Test on Armitage ® Shank Standard Body

| Standard Test Sample (0% wollastonite) | Breaking Energy (ft.lbf) | Test sample thickness (inches) | Strength factor value |
|---|---|---|---|
| Solid cast standard samples | | | |
| 9 | 0.040 | 0.512 | 1.831 |
| 10 | 0.036 | 0.512 | 1.648 |
| 11 | 0.036 | 0.502 | 1.714 |
| Average | 0.037 | 0.509 | 1.731 |

TABLE 11

Impact Resistance Tests on Armitage ® Shanks Bodies with 5% Addition of Grade 3 Wollastonite

| Test Sample | Breaking Energy for Initial Damage (ft.lbf) | Breaking Energy for Final (Breakage) Failure | Thickness (inches) | Strength Value Factor (initial damage) | Strength Value Factor (Final Failure) |
|---|---|---|---|---|---|
| Drain Cast Samples | | | | | |
| 1 | 0.032 | 0.032 | 0.346 | 3.208 | 3.208 |
| 2 | 0.024 | 0.028 | 0.343 | 2.448 | 2.856 |
| 3 | 0.028 | 0.032 | 0.331 | 3.067 | 3.505 |
| 4 | 0.032 | 0.032 | 0.346 | 3.208 | 3.208 |
| 5 | 0.028 | 0.028 | 0.370 | 2.454 | 2.454 |
| 6 | 0.016 | 0.020 | 0.331 | 1.752 | 2.191 |
| 7 | 0.016 | 0.016 | 0.346 | 1.604 | 1.604 |
| 8 | 0.028 | 0.032 | 0.378 | 2.352 | 2.687 |
| Average | 0.026 | 0.028 | 0.349 | 2.512 | 2.714 |
| Solid Cast samples | | | | | |
| 9 | 0.056 | 0.060 | 0.492 | 2.776 | 2.974 |
| 10 | 0.064 | 0.068 | 0.516 | 2.884 | 3.065 |
| 11 | 0.048 | 0.052 | 0.476 | 2.542 | 2.754 |
| Average | 0.056 | 0.060 | 0.495 | 2.734 | 2.931 |

EXAMPLE 15

Additional tests were conducted on full sized lavatory basin pieces. Pieces were cut open before testing so that the inner faces of the test pieces could be examined after each impact. Each impact was made in a fresh location. See Table 12. The sanitaryware bodies comprising 5% of Grade 3 wollastonite had average strength value factors of from about 15.17 to about 19.35, with an average strength value factor of about 17.30. The wollastonite containing bodies had an increase from about 60% to about 65%.

TABLE 12

Impact Tests on Full-Sized Pieces

| Test Sample | Breaking energy (ft.lbf) | Thickness (in.) | Strength value factor |
|---|---|---|---|
| Control Standard 12 | | | |
| Site 1 | 0.08 | 0.315 | 9.67 |
| Site 2 | 0.10 | 0.315 | 12.10 |
| Control Standard 13 | | | |
| Site 1 | 0.10 | 0.335 | 10.69 |

TABLE 12-continued

Impact Tests on Full-Sized Pieces

| Test Sample | Breaking energy (ft.lbf) | Thickness (in.) | Strength value factor |
|---|---|---|---|
| Site 2 | 0.10 | 0.335 | 10.69 |
| Average | 0.095 | 0.325 | 10.79 |
| Sample 14 with 5% Grade 3 wollastonite | | | |
| Site 1 | 0.12 | 0.295 | 16.55 |
| Site 2 | 0.11 | 0.295 | 15.17 |
| Sample 15 with 5% Grade 3 wollastonite | | | |
| Site 1 | 0.15 | 0.315 | 18.14 |
| Site 2 | 0.16 | 0.315 | 19.35 |
| Average | — | — | 17.30 |

EXAMPLE 16

Drying tests were conducted on Armitage® Shanks "Contour" lavatory basins. The sample casts, 1) a standard body with 0% wollastonite and 2) a modified body comprising about 5% Grade 3 wollastonite, were dried as pairs. The casts were allowed to dry for a sufficient time, preferably one hour and then were transferred to a chamber dryer in which a constant forced airflow passed over the pieces. See Table 13. The standard control body suffered a much greater degree of cracking. The body comprising approximate 5% of Grade 3 wollastonite remained undamaged up to an approximate temperature of about 40° C. while the standard body revealed cracking at an approximate temperature of 30° C. Even at the higher temperatures between about 50° C. to 60° C., which caused both bodies to crack, the wollastonite containing body revealed only narrow, short cracks while the standard body revealed more numerous, large open cracks.

TABLE 13

Results of Drying Trials on Armitage ® Shanks Body

| Drying Temperature (° C.) | Standard Control Body (0% wollastonite) | Body comprising 5% Grade 3 wollastonite |
|---|---|---|
| 60 | Severe cracking | Cracks formed (less severe than standard body) |
| 50 | Severe cracking | Cracks formed (less severe than standard body) |
| 45 | Severe cracking | Short drying cracks |
| 40 | Cracks formed | No drying cracks |
| 30 | Short drying cracks | No drying cracks |
| 25 | No drying cracks | No drying cracks |

While the invention has been described in detail and with reference to specific embodiments thereof, it will be apparent to one skilled in the art that various changes and modifications may be made therein without departing from the spirit and scope thereof.

What is claimed:

1. A ceramic, comprising:
   (a) a ball clay;
   (b) a china clay;
   (c) a quartz;
   (d) a feldspar/nepheline syenite; and
   (e) from about 1 percent to about 7 percent dry weight of wollastonite fibers having lengths from about 50 to about 2000 micrometers.

2. The ceramic according to claim 1 wherein the ceramic is unfired.

3. The ceramic according to claim 1 comprising from about three to about 7 percent dry weight wollastonite fibers.

4. The ceramic according to claim 1 comprising about 5 percent dry weight wollastonite fibers.

5. The ceramic according to claim 1 in which the wollastonite fibers have a diameter from about 10 to about 500 micrometers.

6. The ceramic as defined in claim 1 in which the wollastonite fibers have a tap bulk density from about 0.1 g/cc to about 1.4 g/cc.

7. The ceramic of claim 1, further comprising talc.

8. The ceramic of claim 1, further comprising iron.

9. The ceramic of claim 1, further comprising alumina.

10. The ceramic of claim 1, the Wollastonite fibers having lengths of from about 50 to about 1200 micrometers.

11. The ceramic of claim 1, the Wollastonite fibers having aspect ratios from about 2:1 to about 40:1.

12. The ceramic of claim 11, the Wollastonite fibers having aspect ratios from about 3:1 to about 20:1.

13. The ceramic of claim 11, the Wollastonite fibers having tap bulk densities from about 0.6 g/cc to about 1.2 g/cc.

14. A ceramic composition, comprising:
   (a) clay comprised of ball clay and china clay;
   (b) quartz;
   (c) feldspathic material; and
   (d) from about 1 percent to about 10 percent dry weight of Wollastonite fibers having lengths from about 50 to about 2000 micrometers.

15. The ceramic composition of claim 14, the ceramic composition comprising 26% to 35% dry weight of the china clay.

16. The ceramic composition of claim 14, wherein the composition comprises of
   (a) about 22% to about 27% dry weight of the ball clay;
   (b) about 26% to about 35% dry weight of the china clay;
   (c) about 22% to about 32% dry weight of the quartz; and
   (d) about 18% to about 27% dry weight of the feldspathic material.

17. The ceramic composition of claim 14, further comprising talc.

18. The ceramic composition of claim 14, further comprising iron.

19. The ceramic composition of claim 14, further comprising alumina.

20. The ceramic composition of claim 14, wherein the Wollastonite fibers comprise 5% by dry weight of the composition.

21. A ceramic composition, comprising:
   (a) ball clay;
   (b) china clay;
   (c) quartz;
   (d) feldspathic material; and
   (e) Wollastonite fibers having lengths from about 50 to about 2000 micrometers.

22. The ceramic composition of claim 21, wherein the Wollastonite fibers have aspect ratios from about 2:1 to about 40:1.

* * * * *